United States Patent [19]

Kouyama et al.

[11] Patent Number: 4,618,890
[45] Date of Patent: Oct. 21, 1986

[54] DIGITAL AUDIO SYNCHRONIZING SYSTEM WITH MUTE TIME SWITCHING FUNCTION

[75] Inventors: Toshitake Kouyama; Ryoji Katsube, both of Tokyo, Japan

[73] Assignee: NEC Corporation, Japan

[21] Appl. No.: 820,952

[22] Filed: Jan. 21, 1986

[30] Foreign Application Priority Data

Jan. 22, 1985 [JP] Japan .................................. 60-8425

[51] Int. Cl.⁴ ............................................. H04N 5/04
[52] U.S. Cl. .................................... 358/149; 358/339
[58] Field of Search ............... 358/143, 148, 149, 337, 358/339, 85; 360/36.1, 36.2; 179/2 TV

[56] References Cited

U.S. PATENT DOCUMENTS 4,018,990 4/1977 Long et al. .......................... 358/149
4,218,705 8/1980 Inaba et al. ......................... 358/149
4,313,135 1/1982 Cooper ................................ 358/149

Primary Examiner—Jin F. Ng
Attorney, Agent, or Firm—Ostrolenk, Faber, Gerb & Soffen

[57] ABSTRACT

A digital audio synchronizing system resynchronizes the audio signal of a video signal by storing the audio signal in a memory and reading it out from the memory after a time period which is related to the time by which the video signal is delayed as a result of being synchronized to a reference video signal. In order to prevent a discontinuity in the audio signal waveform caused by variations in the video delay between the video signal and the reference signal, the digital audio signal is read out as a first and a second output from memory addresses which correspond to the previous video delay and to a new updated video delay value. A synchronized audio signal is obtained by switching from the first output to the second output when the muting times of the first and the second outputs are coincident with each other. When the both muting times are not coincident with each other within a predetermined time from the variation in the video delay, the first and the second outputs are cross-faded with each other over a predetermined time period and the cross-faded output is produced as the synchronized audio signal for the predetermined time period, and after cross-fade operation, the second output is produced as the synchronized audio signal.

12 Claims, 15 Drawing Figures

DIGITAL AUDIO SYNCHRONIZING SYSTEM WITH MUTE TIME SWITCHING FUNCTION

BACKGROUND OF THE INVENTION (1) Field of the Invention

The present invention relates to a synchronizer, and in particular, to a digital audio synchronizer for compensating an audio signal for a time difference between the audio signal and an associated video signal whose timing is disturbed by being synchronized to a reference video signal.

(2) Description of the Prior Art

In a multi-station TV broadcasting system, a video signal from a local station is frame-synchronized to a reference signal of the central station. The frame synchronization causes a time delay in the video signal, so that a time difference results between the synchronized video signal and an audio signal accompanying for this video signal. In order to compensate the time difference, a digital audio synchronizer or a digital audio-delay device is used.

In a known digital audio synchronizing system, the audio signal is digitalized and then stored in a memory. The stored signal is then read out from the memory. Timewise, the read-out address is offset from the write-in address by a number of address locations corresponding to the time difference of the reference signal from the video signal. Therefore, the output audio signal is delayed from the incoming audio signal by the same time difference as exists between the reference signal and the incoming video signal. Accordingly, the audio signal is synchronized to the video signal which in turn is synchronized to the reference signal.

In the known audio synchronizer, any variation or change in a video delay between the incoming video signal and the reference signal results in a jump in the read-out address. This produces a discontinuity in the output audio signal and ensuing unacceptable click sound.

In order to resolve such a problem, the present inventors already proposed another digital audio synchronizing system in UK patent application GB No. 2 160 393A (corresponding to a copending U.S. application Ser. No. 720,813 filed on Apr. 8, 1985 and assigned to the same assignee) where a digital audio signal read out from memory addresses corresponding to a previous video delay before occurrence of variation in the video delay is cross-faded with another digital audio signal read out from memory addresses offset by the video delay variation, for a predetermined time period.

However, in such an audio synchronizer, if both read-out audio signals having delays before and after occurrence of the video delay variation are equal in the frequency but inverse in the phase, the cross-faded output audio signal has an undesirable waveform which comprises a gradually reducing amplitude portion and a subsequent increasing amplitude portion as if an audio signal is amplitude-modulated, as will be made clear in later description.

SUMMARY OF THE INVENTION

It is an object of the present invention to provide a digital audio synchronizing system which is capable of resolving those problems as described above.

A digital audio synchronizing system is for synchronizing an audio signal accompanying an input composite video signal to a reference composite video signal to which the input composite video signal should be synchronized.

The audio synchronizing system according to the present invention comprises delay detecting means for detecting a video delay between the input and the reference composite video signals to produce a video delay signal representative of the video delay. First means responsive to a control signal stores the video delay signal as a stored delay signal and produces the stored delay signal as a first delay data signal representative of a first delay which the video delay signal has when stored in the first means. Second means produces the video delay as a second delay data signal. Encoding means encodes the audio signal into an input digital audio signal. Delaying means delays, in response to the first and the second delay data signals, the input digital audio signal and produces first and second delayed digital audio signals which have the first video delay and the video delay relative to the input digital audio signal, respectively. Producing means produces the first delayed digital audio signal as an output digital audio signal. Muting flag generating means generates, in response to the first and second delayed digital audio signals, first and second muting flag signals when the first and second delayed digital audio signals are at a predetermined muting level, respectively. Muting coincidence detecting means detects coincidence between said first and second muting flag signals and produces a muting coincident signal. Control signal generating means generates the control signal in response to the coincidence signal.

According to an aspect of this invention, the digital audio synchronizing system further comprises variation detecting means responsive to the video delay signal detects a variation in the video delay and produces a video delay change signal. Cross-fade start signal generating means generates, in response to the video delay change signal, a cross-fade start signal after a predetermined time from the variation. Cross-fading means responsive to the cross-fade start signal cross-fades the first and second delayed digital audio signals during a predetermined cross-fade period and produces a cross-faded signal during the predetermined cross-fade period. Cross-fading means furthermore produces a cross-fade end signal at an end of the predetermined cross-fade period. Producing means is coupled to the cross-fading means and produces the cross-faded signal and the first delayed digital audio signal as the output digital audio signal during the cross-fade period and except for the cross-fade period, respectively. Control signal generating means is coupled to the cross-fading means and produces the control signal in response to the coincidence signal and furthermore in response to the cross-fade end signal.

Further objects, features and other aspects will be understood from the following detailed description of preferred embodiments of the present invention referring to the accompanying drawings.

DETAILED DESCRIPTION OF PREFERRED EMBODIMENTS

Prior to describing of embodiments of the present invention, a known audio synchronizing system is described below.

Figure 1:
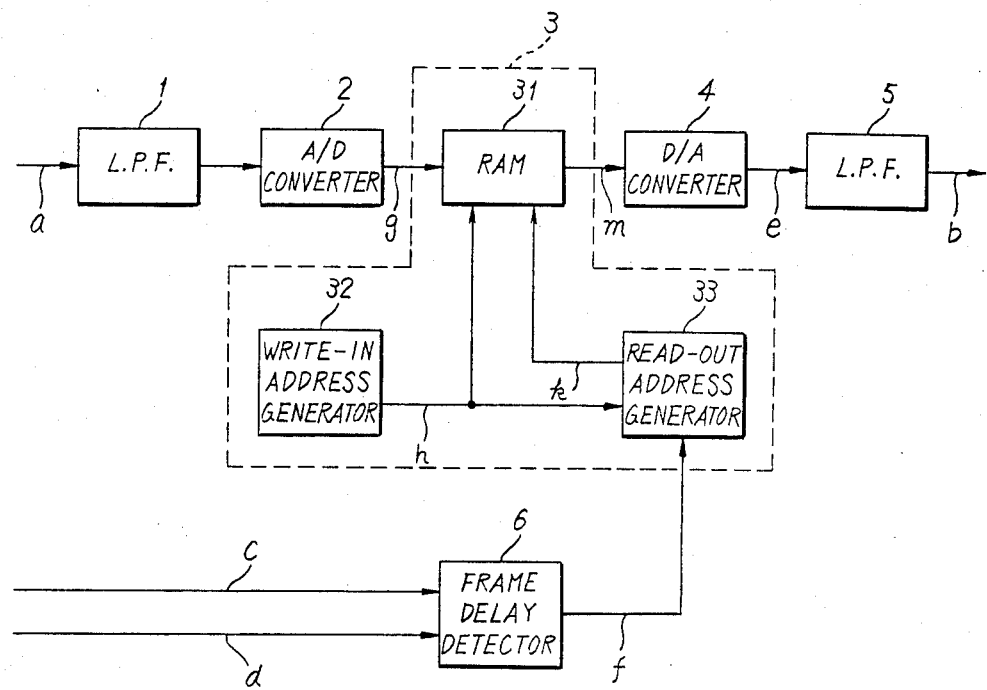
FIG. 1 is a schematic circuit diagram view of a known audio synchronizing system.

Referring to FIG. 1, an incoming audio signal a of the audio synchronizer shown therein is supplied through a low-pass filter (L.P.F.) 1 to an analog-digital (A/D) converter 2. The audio signal is sampled by sampling pulses having a frequency of, for example, 48 kHz and each sample is quantized into, for example, 16 bits. The 16-bit digital audio signal g from A/D converter 2 is written into a random access memory (RAM) 31 in a delaying circuit 3. The digital audio signal stored in RAM 31 is read out as a delayed digital audio signal m into a digital-analog (D/A) converter 4, from which a pulse-amplitude-modulated (PAM) audio signal e is obtained. The PAM audio signal is supplied to a low-pass filter 5, from which the regenerated audio signal b is obtained.

Figure 6:
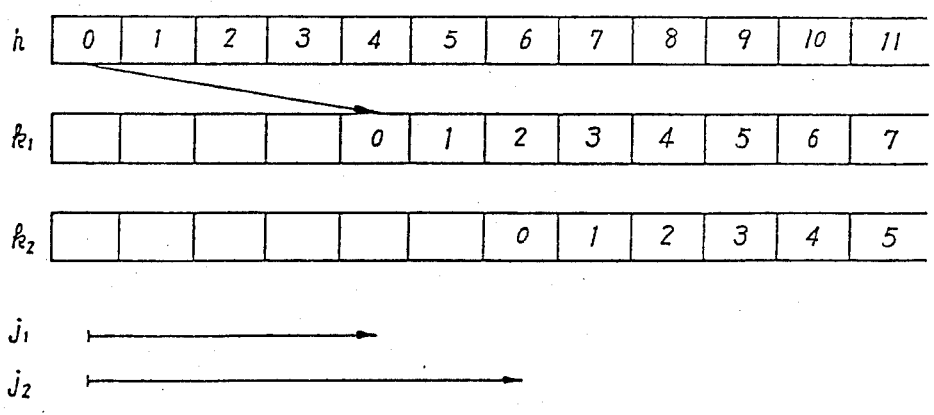
FIG. 6 is a schematic view illustrating write-in and read-out address data for explaining operation of a read-out address generator shown in FIG. 3.

To store the 16-bit digital audio signal g into RAM 31, a write-in address generator 32 is provided in the delayed circuit 3 and supplies a write-in address data signal h to RAM 31. The write-in address data signal h represents an address such as the address "0", the address "1", . . . , in RAM 31 as shown in FIG. 6, which is available at a rate of a frequency equal to the sampling frequency of 48 kHz.

The write-in address generator 32 consists of a counter counting clock pulses of 48 kHz from a clock pulse generator (not shown). The counter is of a type which self-clears itself after it reaches a predetermined maximum count value. Where RAM 31 is selected to store the audio data signal for a period of one frame (33 msec in the NTSC system) of the video signal, the counter will self-clear when it reaches the value of 1584 (=48×33).

A read-out address data signal k is provided from a read-out address generator 33 in the delaying circuit 3 to specify an address in RAM 31 from which the stored signal is read out. The read-out addresses are also generated at the rate of 48 kHz but with a time offset from the write-in address signal h. The read-out address generator 33 consists of a subtractor for subtracting from the write-in address data signal h a video delay signal f corresponding to a delay time of the audio signal, or a video delay between an incoming composite video signal c accompanying the incoming audio signal a and the reference composite video signal d.

The incoming composite video signal c and the reference composite video signal d are supplied to a frame delay detection 6, where the video delay of the reference composite signal d and the incoming composite video signal c is detected and determined. The delay time of the audio signal is governed by this detected video delay. A video delay signal f is corresponding to this delay time, and it is sent out from delay detector 6 to read-out address generator 33.

In the above-described arrangement, the read-out address from read-out address generator 33 jumps from an address to a remote address when the delay time rapidly changes. Therefore, a discontinuity presents in the output audio signal b.

In order to solve such a problem, the present inventors already proposed another digital audio synchronizing system as described above. The another digital audio synchronizing system comprises variation detecting means for detecting a variation in the video delay. Delaying means produces first and second delayed audio signals corresponding to the previously detected video delay and the video delay. Cross-fading means cross-fades the first and second delayed audio signals for a predetermined cross-fade period.

However, the another audio synchronizer has a disadvantage which will be described below.

Figure 2:
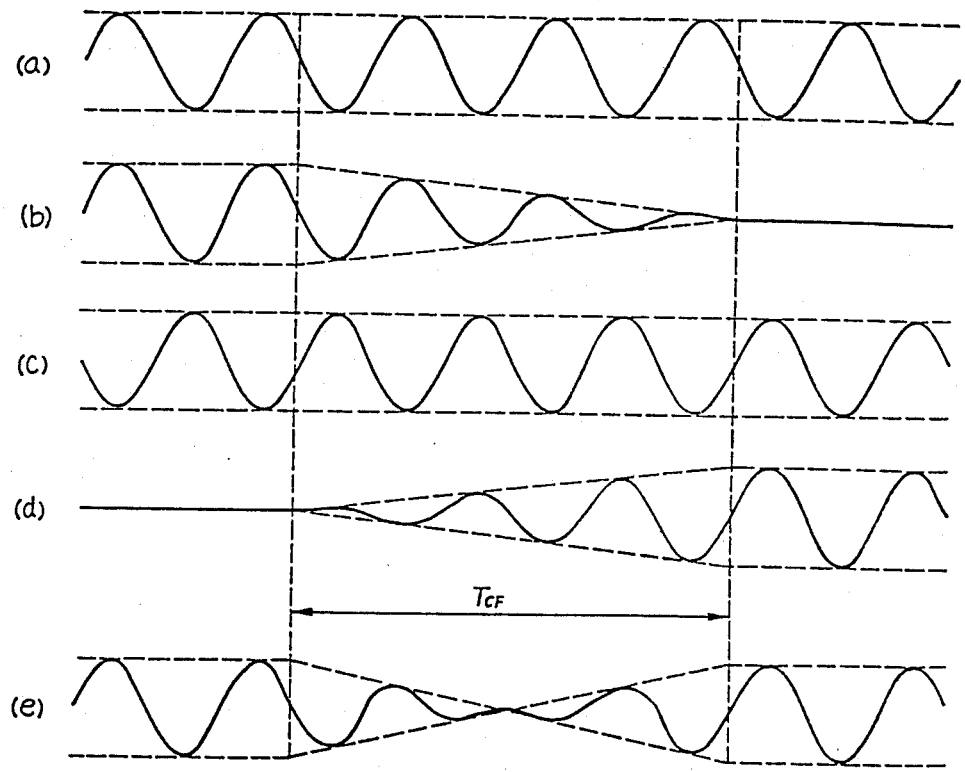
FIG. 2 illustrates various waveforms of an audio signal useful for explaining operation of another known audio synchronizing system.

Referring to FIG. 2, the first and second delayed audio signals are as shown at (a) and (c), respectively. The first and second delayed audio signals shown therein are equal to each other in frequency but inverse with each other in phase. In the cross-fading operation, the first delayed audio signal is faded out for the predetermined cross-fade period $T_{CF}$, as shown at (b). The second delayed audio signal is faded in for the predetermined cross-fade period $T_{CF}$, as shown at (d). The faded-out signal and the faded-in signal are added to each other, and a cross-faded signal is obtained as shown at (e) in FIG. 2. The cross-faded signal has an undesirable waveform having a gradually reducing amplitude portion and a subsequent gradually increasing amplitude portion as if an audio signal is amplitude-modulated to have an undesirable amplitude reduction.

The present invention overcomes those problems in the known audio synchronizers.

Figure 3:
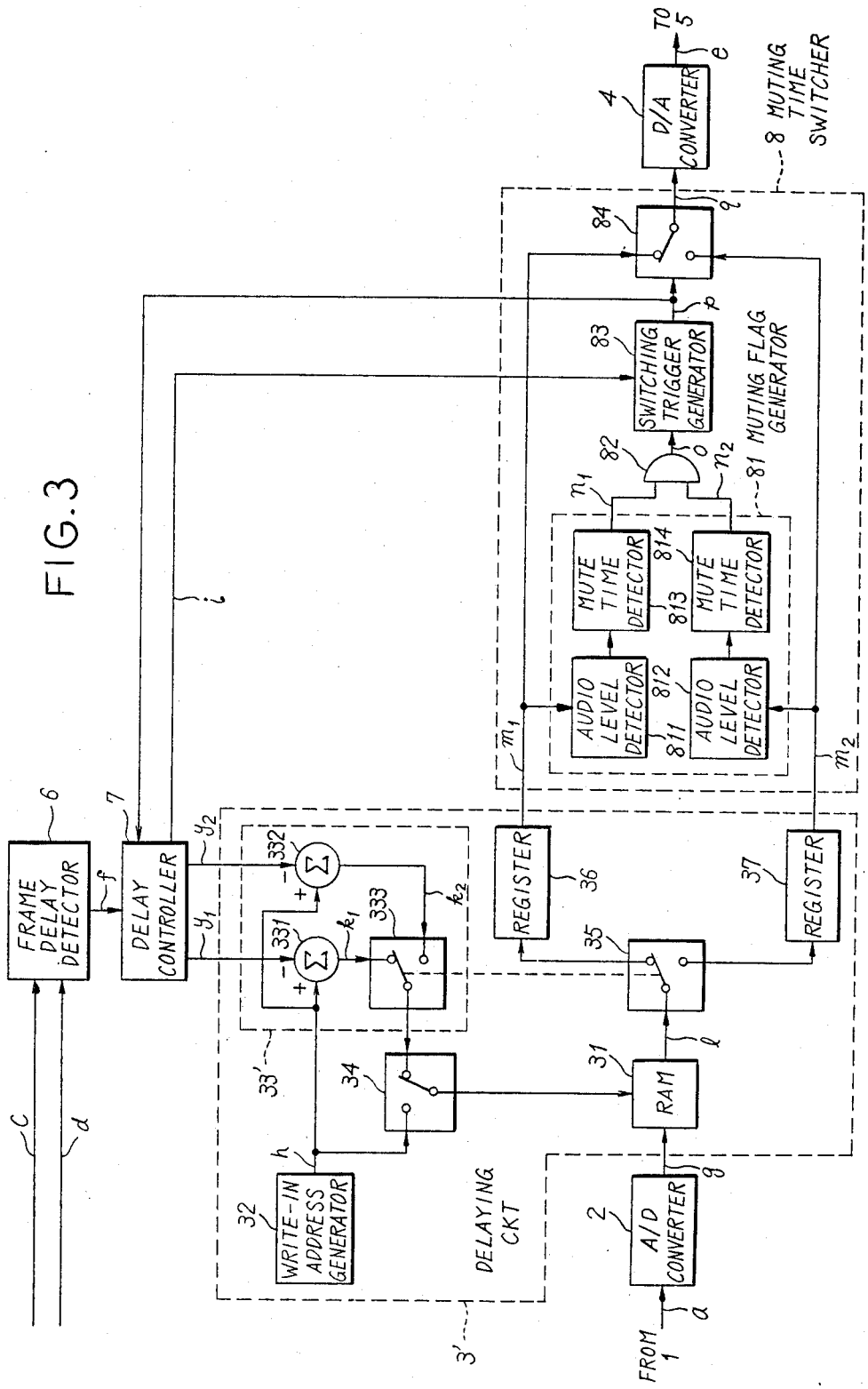
FIG. 3 is a block diagram of a main part of a first embodiment according to the present invention.

Referring to FIG. 3, a first embodiment of an audio synchronizing system according to the present invention includes similar circuit portions designated by the same reference numerals as in FIG. 1. That is, A/D converter 2, D/A converter 4, and frame delay detector 6 are similar to those in FIG. 1, and therefore, description thereto is omitted. The low-pass filters should be provided as in FIG. 1 but are not shown in FIG. 3.

The audio synchronizer of FIG. 3 further comprises a delay controller 7, a delaying circuit 3' and a muting time switcher 8.

Delay controller 7 receives the video delay signal f from frame delay detector 6 and a control signal p, and produces a first and a second video delay data signal $j_1$ and $j_2$, and a video delay change signal.

Figure 4:
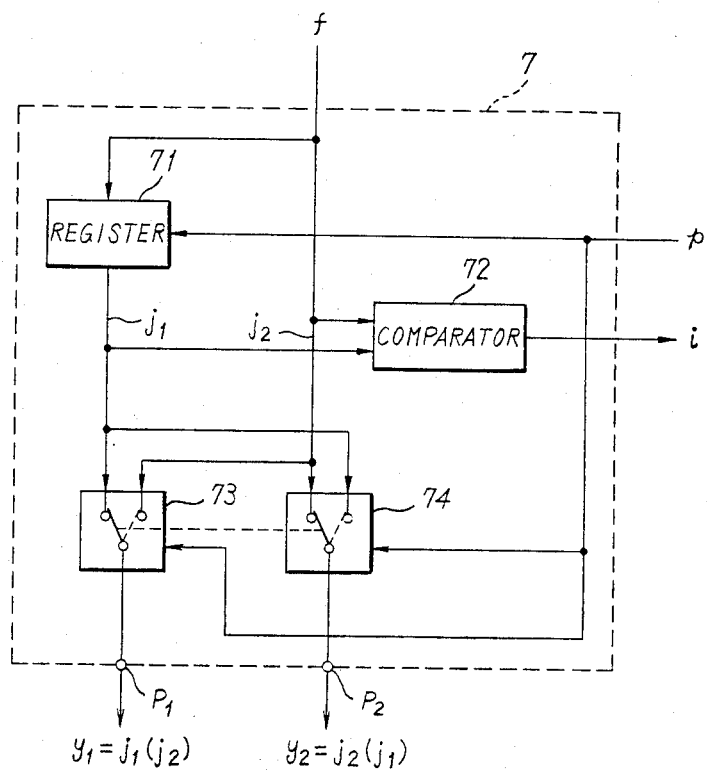
FIG. 4 is a block diagram of a delay controller illustrated in FIG. 3.

Referring to FIG. 4, delay controller 7 comprises a first register 71, a comparator 72, and a first and a second selector switch 73 and 74.

First register 71 stores the video delay signal f as a stored delay signal in response to the control pulse p from a switching trigger generator 83 and produces the stored delay signal as the first delay data signal $j_1$. The first delay data signal represents a first delay which the video delay signal f has when stored in register 71. The video delay signal f is used as the second delay data signal $j_2$.

Comparator 72 compares the video delay signal f and the first delay data signal $j_1$ and produces the video delay change signal i. The video delay change signal i has an "H" level when the video delay signal f and the first delay data signal $j_1$ are not coincident with each other, but has an "L" level when they coincides with each other.

Before any variation is caused in the video delay signal f, first and second delay time data signals $j_1$ and $j_2$ represent a same time delay. However, after a variation is caused, first delay time data signal $j_1$ represents the time delay before the variation while second delay time data signal $j_2$ represents the varied time delay. Thereafter, when control signal p is supplied to register 71, the video delay signal f after varied is stored in register 71. Accordingly, first and second delay data signals $j_1$ and $J_2$ again represent a same time delay.

First and second delay data signals $j_1$ and $j_2$ are supplied to selector switches 73 and 74. Selector switch 73 selects one of the first and second delay data signals $j_1$ and $j_2$ while selector switch 74 selects the other in response to the control signal p. The selected signals are supplied from selector switches 73 and 74 to output terminals $P_1$ and $P_2$, respectively. In FIGS. 3 and 4, first delay data signal $j_1$ is shown to be supplied to output terminal $P_1$ while second delay data signal $j_2$ being supplied to output terminal $P_2$.

Selector switches 73 and 74 are switched in response to control signal p so that first and second delay data signals $j_1$ and $j_2$ are alternatingly selected at selector switch 73 while secohd and first delay data signals $j_2$ and $j_1$ are alternatingly selected at selector switch 74, in response to control signal p which is described hereinafter.

Delaying circuit 3' comprises an RAM 31, a write-in address generator 32, and a read-out address generator 33'.

Write-in address generator 32 generates a write-in address data signal h similar to write-in address generator 32 in FIG. 1.

Read-out address generator 33' consists of a first subtractor 331, a second subtractor 332, and a third selector switch 333. First subtractor 331 has two input terminals connected to output terminal $P_1$ of delay controller 7 and an output of write-in address generator 32, respectively, and subtracts an input signal $y_1$ from the output terminal $P_1$ from the write-in address data signal h. A subtracted output signal $k_1$ is supplied to selector switch 333 as a first read-out address data signal.

Second subtractor 332 subtracts an input signal $y_2$ from output terminal $P_2$ from write-in address data signal h and produces a second read-out address data signal $k_2$.

These first and second read-out address data signals $k_1$ and $k_2$ are selected in this order during one time period of the clock pulses.

Delaying circuit 3' further comprises a fourth selector switch 34, a fifth selector switch 35, a second register 36, and a third register 37. Fourth selector switch 34 selects the write-in address data signal h and an output signal from the third selector switch 333 in this order during one time period of the clock pulses. The selected signal is supplied to RAM 31. Fifth selector switch 35 operates synchronously third selector switch 333. That is, when third selector switch 333 selects the first read-out address data signal $k_1$, fifth selector switch 35 connects a read-out signal of RAM 31 to second register 36. When third selector switch 333 selects the second read-out address data signal $k_2$, fifth selector switch 35 connects the read-out signal of RAM 31 to third register 37.

Therefore, during one repetition period of the clock pulses, the digital audio signal g from A/D converter 2 is written into RAM 31 according to the write-in address data signal h, and the stored digital audio signal is read out according to first and second read-out address data signals $k_1$ and $k_2$ successively. The successively read-out digital data signals are stored in the second and the third registers 36 and 37 through fifth selector switch 35, respectively.

The digital audio signal $m_1$ registered in register 36 is delayed from the input digital audio signal g by a delay time represented by the input signal $y_1$. When the first delay data signal $j_1$ is supplied as the input signal $y_1$, as shown in FIGS. 3 and 4, the delay of digital audio signal $m_1$ corresponds to a video delay stored in register 71. The other digital audio signal $m_2$ registered in register 37 is delayed from the input digital audio signal g by a delay time represented by the input signal $y_2$, that is, the time delay represented by the second delay data signal $j_2$ in the shown case.

Muting time switcher 8 comprises a muting flag generator 81, an AND gate 82, a switching trigger generator 83, and a sixth selector switch 84.

Muting flag generator 81 consists of first and second audio level detectors 811 and 812, and first and second mute time detectors 813 and 814.

First and second audio level detectors 811 and 812 detect signal levels of the two delayed digital audio signals $m_1$ and $m_2$ which are stored in registers 36 and 37, respectively. First and second audio level detectors 811 and 812 produce first and second muting level signals when signal levels of the two delayed digital audio signals $m_1$ and $m_2$ are lower than a predetermined muting level, respectively.

First and second mute time detectors 813 and 814 detect durations of the first and the second mute level signals, respectively, and generate first and second muting flag signals $n_1$ and $n_2$ of "H" level when the durations of the first and second muting level signals are longer than a predetermined time $T_0$, respectively.

AND gate 82 is for detecting coincidence between the first and second muting flag signals $n_1$ and $n_2$, and produces a muting coincidence signal o when the first and second muting flag signals $n_1$ and $n_2$ are coincident with each other.

Switching trigger generator 83 generates the control signal p to the sixth selector switch 84 and the delay controller 7 in response to the muting coincidence signal o during reception of the video delay change signal i.

Sixth selector switch 84 selects alternately one of the two delayed digital audio signals $m_1$ and $m_2$ in registers 36 and 37 each time when the control signal p is received, and produces the selected one as an output digital audio signal q. The output digital audio signal is supplied to D/A converter 4.

The operation of the synchronizer of FIG. 3 is described below with reference to FIG. 5.

When the video delay between the incoming composite video signal c and the reference composite video signal d remains at a constant time, for example, 1/12 msec, the video delay signal f from frame delay detector 6 has a value of "4" corresponding to this video delay of 1/12 msec. The video delay change signal i is at "L" level, and the first and the second delay data signals $j_1$ and $J_2$ have also the same value of "4". In this condition, the data in RAM 31 are read out from addresses given by the first and second read-out address data signals $k_1$ and $k_2$ ($=h-4$) and are stored in registers 36 and 37. The read-out digital audio signals $m_1$ and $m_2$ have the same delay of 1/12 msec relative to the input digital audio signal g. One of the delayed digital audio signal $m_1$ is selected by selector switch 84 and is supplied to D/A converter 4 as an output digital audio signal.

Now, the video delay between the incoming composite video signal c and the reference composite video signal d changes from 1/12 msec to another time, for example, ⅛ msec at a point of time $t_1$. The video delay signal f has a value of "6" corresponding to the video delay of ⅛ msec. The video delay change signal i changes from "L" level signal to "H" level signal. The first delay data signal $j_1$ is maintained to have a value of "4", as shown in FIG. 6, because the content in register 71 is not yet rewritten. The second delay data signal $j_2$ changes from "4" to "6", as shown in FIG. 6.

Figure 5:
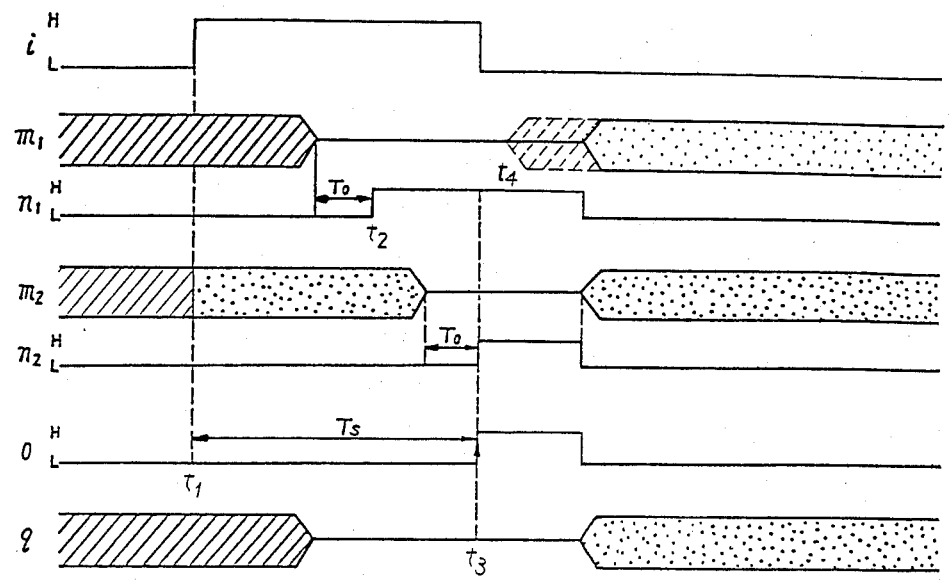
FIG. 5 illustrates waveforms at various points for explaining the operation of the first embodiment of FIG. 3.

Since first delay data signal $j_1$ is selected by selector switch 73 as input signal $y_1$, the digital audio signal $m_1$ read out into register 36 has still the delay of 1/12 msec relative to input audio signal g, as shown in FIG. 5. While, digital audio signal $m_2$ to register 37 is read out according to address data $k_2$ ($=h-6$) determined by second delay data signal $j_2$ supplied to the input signal $y_2$, as shown in FIGS. 5 and 6, and has another delay of ⅛ msec. The delayed digital audio signal $m_1$ is still produced as the output digital audio signal q through selector switch 84, as shown in FIG. 5.

Muting flag generator 81 watches the signal levels of the two read-out digital audio signals $m_1$ and $m_2$. After one of the first and the second muting flag signals, for example, first muting flag signal $n_1$ changes from "L" level signal to "H" level signal at a time of $t_2$, and when the second muting flag signal $n_2$ is changed from "L" level signal to "H" level signal at a time $t_3$ during a period when the first muting flag signal $n_1$ is maintained at "H" level, the output signal of AND gate 82, namely, the muting coincidence signal o changes from "L" level signal to "H" level signal, as shown in FIG. 5. In this point of time $t_3$, the video delay change signal i is still maintained at "H" level signal, so switching trigger generator 83 generates the control signal p to selector switch 84 and delay controller 7. Therefore, the delayed digital audio signal $m_2$ in register 37 is selected by selector switch 84 as the output digital audio signal q, as shown in FIG. 5.

Thus, after the video delay f changes, the output audio signal q is also switched to a delayed audio signal having the changed video delay, so that the audio signal is synchronized to the reference composite video signal. Furthermore, since the switching of the output audio signal is performed within a mute time of the audio signal, the undesirable click sound is not generated by the switching.

In response to control signal p, the video delay signal f is stored in register 71. Therefore, the first and second delay data signals $j_1$ and $j_2$ is again equal to each other. Then, the video delay change signal i from comparator 72 changes from "H" level to "L" level.

First and second selector switches 73 and 74 select the second delay data signal $j_2$ and the first delay data signal $j_1$, respectively, in response to the control signal p. Therefore, the first and the second input signals $y_1$ and $y_2$ of the delaying circuit 3' are switched to the second and the first delay data signals, respectively. However, first and second delay data signals $j_1$ and $j_2$ are already changed to have the same video delay after changed, as described above. Therefore, the digital audio signal $m_1$ read out to register 36 does not have the delay before variation in the video delay but the delay after variation in the video delay, as shown in FIG. 5. A portion hatched by dashed lines of signal $m_1$ in FIG. 5 illustrates an audio signal $m_1$ after a mute time which would be read out from the RAM 31 when the variation is not caused in the video delay.

The digital audio signal $m_2$ also has the delay after variation in the video delay, although it is now read out according to the address data signal determined by the first delay data signal $j_1$.

Thereafter, when another variation is caused in the video delay signal f, the digital audio signal having the delay corresponding to the variation is read out into register 36 because the second delay data signal is now supplied to delaying circuit 3' as the input signal $y_2$, while the digital audio signal having the delay before the variation is read out into register 37. Then, muting flag generator 81 generates muting flag signals $n_1$ and $n_2$ in the similar manner as described above. When the muting flag signals $n_1$ and $n_2$ are coincident with each other, the control signal p is generated from switching trigger generator 83 in the similar manner as described above. Then, selector switch 84 selects register 36 and produce the delayed digital audio signal $m_1$ having the delay after the variation as the output digital audio signal q. In response to the control signal p, the video delay signal f is stored into register 71, and the first and second delay data signals $j_1$ and $j_2$ are again distributed to delaying circuit 3' as first and second input signals $y_1$ and $y_2$, respectively.

Thereafter, the above-described manner is repeated upon variation in the video delay, and switching of the delayed digital audio signals having the delays before and after each variation in the video delay can be performed within a coincident mute period of the both digital audio signals.

In the above-described embodiment, although the switching of two audio signals is performed at a time $t_3$ equal to leading edge of the muting coincidence signal o, as shown in FIG. 5, it can be performed at a time $t_4$ equal to trailing edge of the muting coincidence signal o.

Further, comparator 72 can be omitted. In the case, switching trigger generator 83 should be modified to generate control signal p at each reception of coincident signal o. However, use of the comparator 72 is desired for preventing register 71, selector switches 73, 74 and 84 from operating in response to coincidence signal o when the video delay remains constant.

Figure 7:
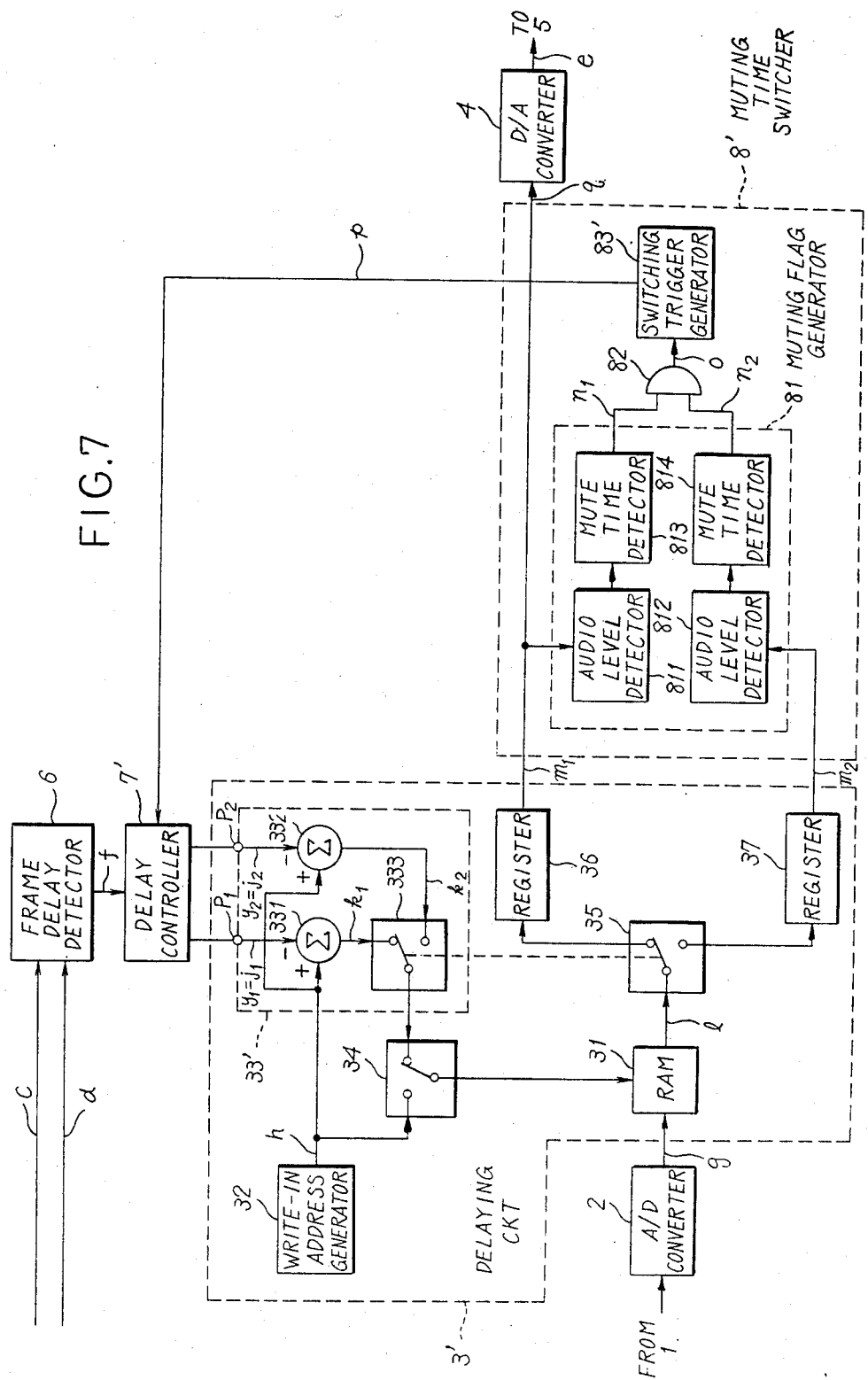
FIG. 7 is a block diagram of a main part of a second embodiment according to the present invention.

Referring to FIG. 7, a second embodiment of an audio synchronizing system according to the present invention is similar to that illustrated in FIGS. 3 and 4 except that selector switches 73, 74 and 76 and comparator 72 are omitted. The similar parts are represented by the same reference characters as in FIG. 3.

Delay controller 7' is different from delay controller 7 of FIGS. 3 and 4 by omitting comparator 72 and selector switches 73 and 74 in FIG. 4. That is, the delay controller 7' has the register 71 into which the video delay signal f is stored in response to control signal p. The first delay data signal $j_1$ is always supplied to output terminal $P_1$ from register 71, while the second delay data signal $j_2$ is always supplied to output terminal $P_2$ from the input video delay signal f.

Delaying circuit 3' is arranged and operates in similar manner as in FIG. 3. That is, delayed digital audio signals $m_1$ and $m_2$ read out into registers 36 and 37 have delays in response to input signals $y_1$ and $y_2$. In this embodiment, first and second delay data signals $j_1$ and $j_2$ are always supplied to delaying circuit 3' as input signals $y_1$ and $y_2$, respectively. Therefore, the first delayed digital audio signal $m_1$ always has a delay represented by the first delay data signal $j_1$, and the second delayed digital audio signal $m_2$ has a delay represented by the second delay data signal $j_2$. Accordingly, when a variation is caused in the video delay signal f at $t_1$, the second delayed digital audio signal $m_2$ has a new delay but the first delayed digital audio signal has still a previous delay, as shown in FIG. 8.

Muting flag generator 81 is also similar to that in FIG. 3. When muting flag signals $n_1$ and $n_2$ are generated from muting flag generator 81 and when they coincide with each other, coincidence signal o is generated from AND gate 82, as shown in FIG. 8.

Figure 8:
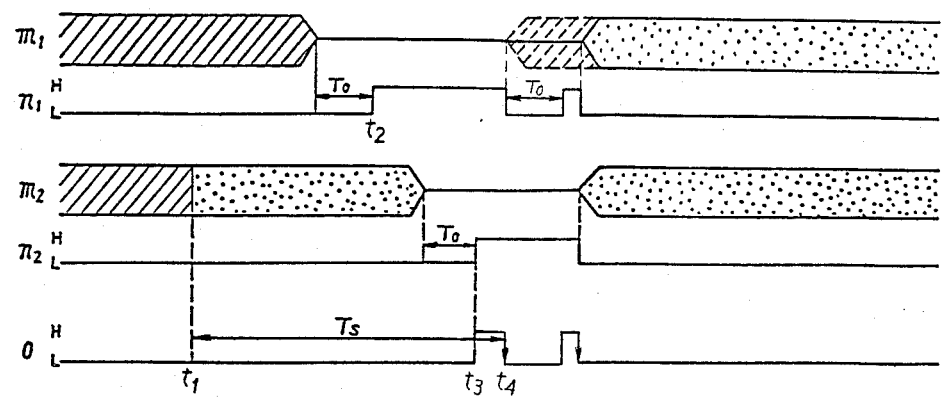
FIG. 8 illustrates waveforms at various points for explaining operation of the embodiment of FIG. 7.

Switching trigger generator 83' generates control signal p by trailing edge of the muting coincidence signal o at $t_4$ as shown in FIG. 8. The control signal p can be generated by the leading edge of the coincidence signal o. The control signal p is supplied to delay controller 7'. Then, first delay data signal $j_1$ has the new delay. Accordingly, the first delayed digital audio signal $m_1$ read out into register 36 has the new delay. That is, the first delayed audio signal $m_1$ read out into register 36 is switched from a signal having the previous delay to another signal having the new delay during the mute time of the both signals, as shown in FIG. 8.

The output of register 36 is connected to D/A converter 4. That is, the first delayed digital audio signal $m_1$ is supplied to D/A converter 4 as the output digital audio signal q.

In the second embodiment, delay controller 7' is not provided with comparator (72 in FIG. 4). However, the comparator can be also used for preventing switching trigger generator 83' from being actuated by coincidence signal o generated within a time period when first and second delay data signals $j_1$ and $j_2$ represent a same delay.

In the above-described embodiments, the switching of the output signal from the audio signal having a previous delay to the audio signal having a new delay is performed when both muting periods of the first and second read-out audio signals are coincident with each other after variation in the video delay signal f. However, in case both muting periods of the delayed audio signals are not coincident with each other for a long time, response of the audio delay is undesirably delayed to variation in the video delay signal f. That is, a waiting period $T_S$ (as shown in FIG. 5 and FIG. 8) from the variation to generation of the control signal is too long. This problem can be resolved in the following embodiments according to the present invention.

Figure 9:
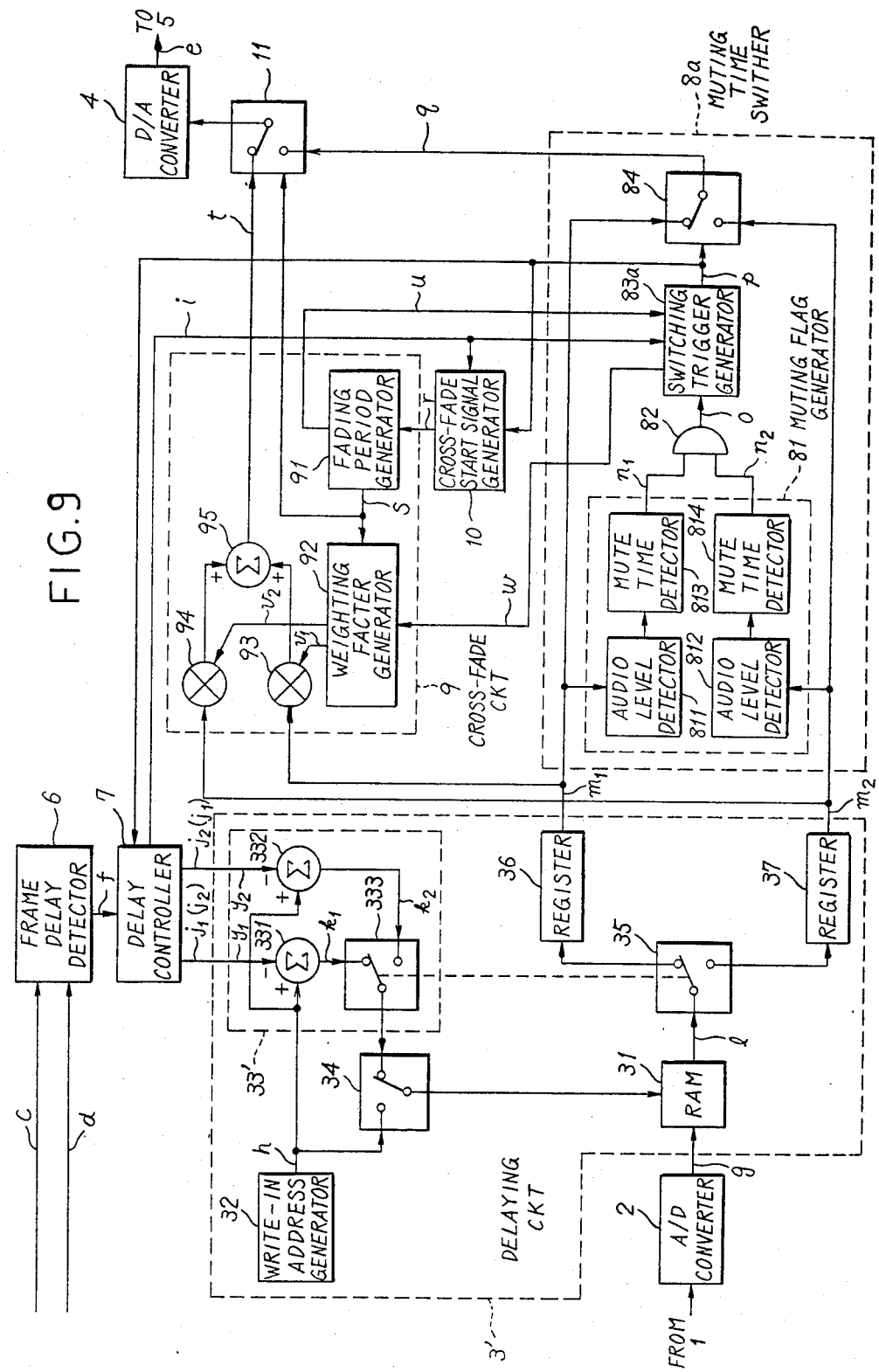
FIG. 9 is a block diagram of a main part of a third embodiment according to the present invention.

Referring to FIG. 9, a third embodiment of an audio synchronizing system according to the present invention is similar to that illustrated in FIG. 3 except that a cross-fade circuit 9, a cross-fade start signal generator 10, and a seventh selector switch 11 are added to the synchronizer of FIG. 3. Therefore, the similar parts are designated by the same reference characters as in FIG. 3, and description thereto is not made.

Cross-fade circuit 9 cross-fades the first and second read-out digital audio signals $m_1$ and $m_2$ during a predetermined cross-fade period in response to a cross-fade start signal r.

The cross-fade start signal r is generated by cross-fade start signal generator 10 at a predetermined time $T_1$ after detecting variation in the video delay. The cross-fade start signal generator 10 is composed of a counter actuated by the video delay change signal i. After being actuated, the counter counts up clock pulses (not shown) and produces an output signal as the cross-fade start signal when it reaches a predetermined maximum count value.

The control signal p is applied to the counter as a reset signal from switching trigger generator 83a similar to 83 in FIG. 3. Therefore, when the control signal p is generated before the counter counts up to the maximum value, the counter is reset. The cross-fade start signal r is not generated so that the cross-fade operation is not performed.

Cross-fade circuit 9 produces a cross-faded signal t during the predetermined cross-fade period and produces a cross-fade end signal u at an end of the predetermined cross-fade period.

Cross-fade circuit 9 comprises a fading period generator 91, a weighting factor generator 92, first and second multipliers 93 and 94, and an adder 95.

Fading period generator 91 provides a cross-fade period signal s of "H" level for weighting factor generator 92 and seventh selector switch 11 during the predetermined cross-fade period $T_2$ in response to the cross-fade start signal r. After lapse of the cross-fade period, fading period generator 91 changes the cross-fade period signal s from "H" level signal to "L" level signal. At that time, fading period generator 91 furthermore provides a cross-fade end signal u for switching trigger generator 83a.

Weighting factor generator 92 generates first and second coefficient signals $v_1$ and $v_2$ for multipliers 93 and 94. First coefficient signal $v_1$ has one of two values 1 and 0 and second coefficient signal $v_2$ has the other in absence of the cross-fade period signal s. Weighting factor generator 92 exchanges the values of first and second coefficient signals $v_1$ and $v_2$ in response to a trigger pulse w from switching trigger generator 83a. Further, the weighting factor generator 92 changes each value of the first and second coefficient signals $v_1$ and $v_2$ in response to the cross-fade period signal s. That is, in dependence on the value of 1 or 0 of each coefficient signal of $v_1$ and $v_2$, coefficient of $(1-K)$ or K is generated. K gradually increases from 0 to 1 during the cross-fade period $T_2$. After completion of the cross-fade operation, the value of each coefficient signal of $v_1$ and $v_2$ maintained 0 or 1 in dependence on $(1-K)$ or K until the next trigger pulse w or cross-fade period signal s is applied thereto.

First and second multipliers 93 and 94 multiply the first and second read-out digital audio signals $m_1$ and $m_2$ by the first and second coefficient signals $v_1$ and $v_2$, respectively.

Adder 95 adds outputs of both multipliers 93 and 94 to each other.

Seventh selector switch 11 selects one of the output signals t and q of adder 95 and of sixth selector switch 84 and supplies the selected one to D/A converter 4. Selector switch 11 selects the output signal t from adder 95 during the cross-fade period.

Switching trigger generator 83a produces the control signal p in response to the coincidence signal o and also to the cross-fade end signal u, and also produces trigger pulse w in response to only the coincidence signal o.

The operation of the circuit of FIG. 9 is now described with reference to FIG. 10 and FIG. 11.

Figure 10:
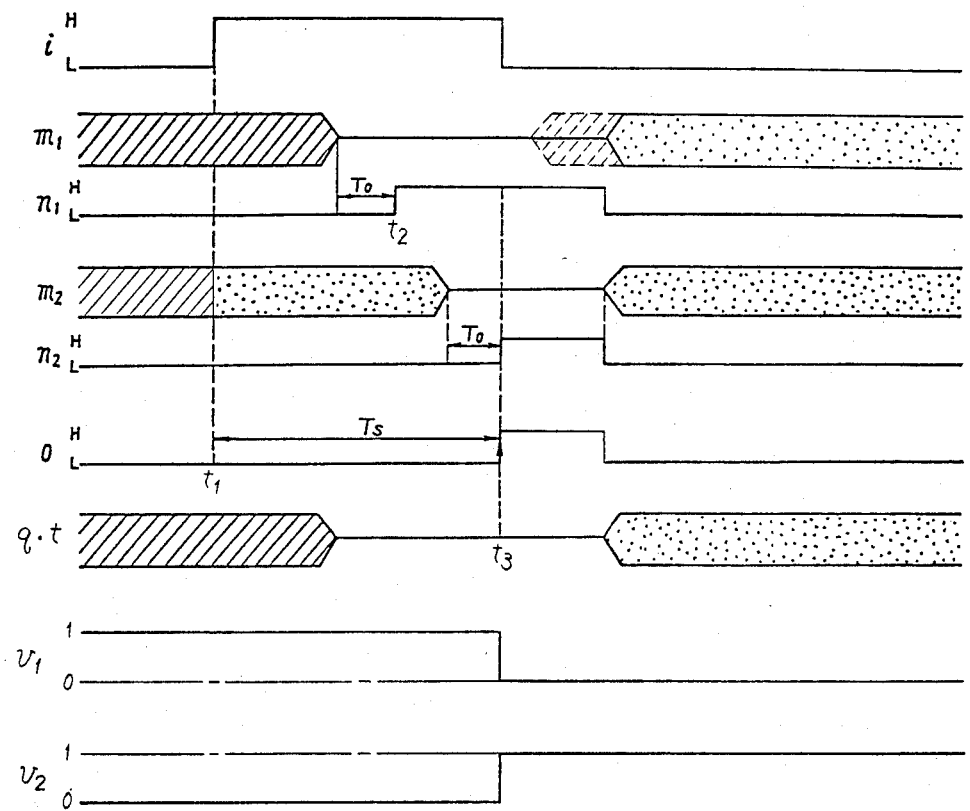
FIG. 10 and FIG. 11 illustrate waveforms at various points for explaining operation of the third embodiment of FIG. 9.

FIG. 10 is similar to FIG. 5 except that waveforms of the first and second coefficient signals $v_1$ and $v_2$ are added.

Now, it is provided that first and second delay data signals $j_1$ and $j_2$ are applied to delaying circuit 3' as input signals $y_1$ and $y_2$, respectively.

When the video delay change signal i is "H" level signal and when the muting coincidence signal o changes from "L" level signal to "H" level signal in the manner as described in connection with FIGS. 3–6, switching trigger generator 83a generates control signal p and trigger pulse w at a time $t_3$ as shown in FIG. 10. As a result, first and second delay data signals $j_1$ and $j_2$ are distributed to input signals $y_2$ and $y_1$. At this time, weighting factor generator 92 changes rapidly the first coefficient signal $v_1$ from "H" level signal to "L" level signal, and changes rapidly the second coefficient signal $v_2$ from "L" level signal to "H" level signal, that is, 0 to 1 as shown in FIG. 10.

Figure 11:
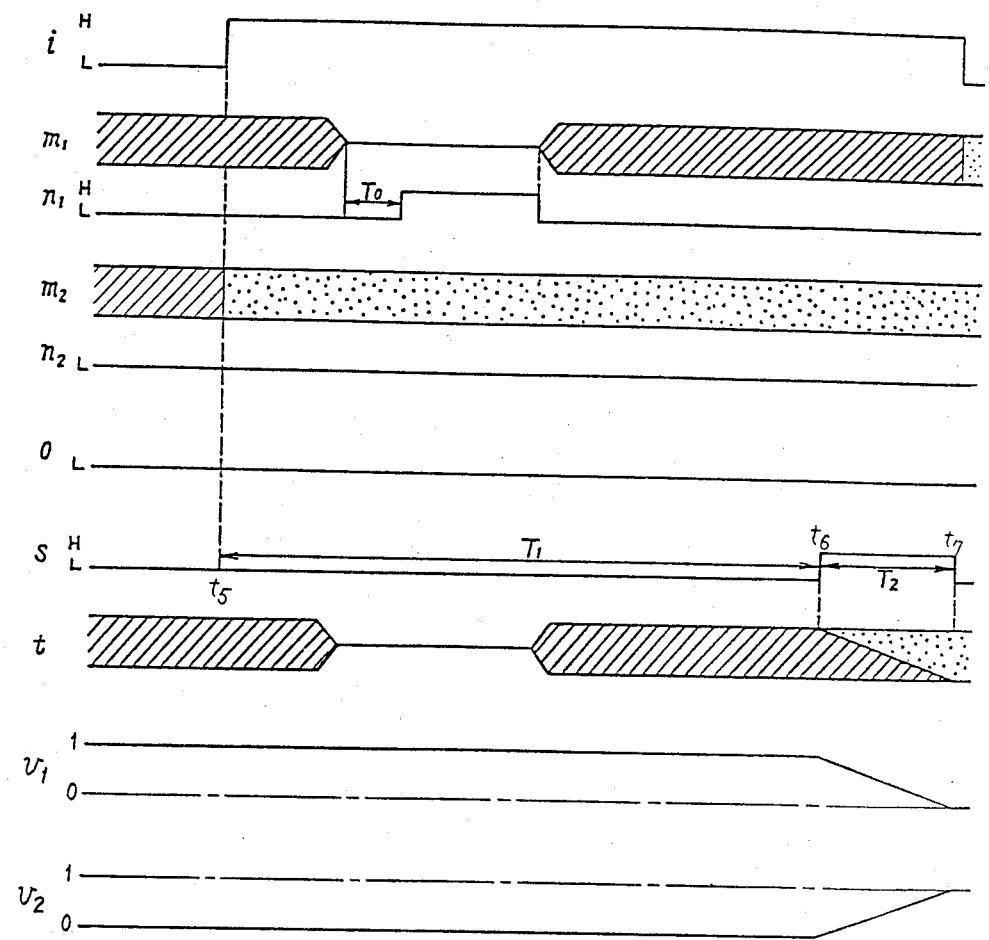

FIG. 11 shows waveforms in the case that the coincidence of both muting period does not occur for a long time.

Referring to FIG. 11, after the predetermined time $T_1$ from a time $t_5$ when the variation is caused in the video delay, the cross-fade start signal r is generated by cross-fade start signal generator 10. Then, fading period generator 91 changes the cross-fade period signal s from "L" level signal to "H" level signal. Accordingly, selector switch 11 selects the output signal t of adder 95, the first coefficient signal $v_1$ decreases gradually from 1 to 0 during the cross-fade period $T_2$, and the second coefficient signal $v_2$ increases gradually from 0 to 1 during the cross-fade period $T_2$. Therefore, delayed digital audio signal $m_1$ from register 36 is faded out at multiplier 93 and delayed digital audio signal $m_2$ from register 37 is faded in at multiplier 94. The faded-out signal and the faded-in signal are added to each other at adder 95, from which a cross-faded signal t is produced. The resultant cross-faded signal t is supplied to D/A converter 4 through selector switch 11 and converted into an analog signal thereat.

At a time $t_7$ after the cross-fade period $T_2$ is ended, the cross-fade end signal u is supplied from fading period generator 91 to switching trigger generator 83a. As a result, control signal p is generated and controls selector switch 84 to select register 37. At the same time, cross-fade period signal s of "L" level is also supplied to selector switch 11 and weighting factor generator 92 from fading period generator 91. Accordingly, the content of register 37 is supplied to D/A converter 4 through selector switches 84 and 11, and converted into an analog signal thereat. In response to the control signal p, delay controller 7 changes the video delay change signal i from "H" level signal to "L" level signal, register (71 in FIG. 4) stores the video delay signal f, and selector switches (73 and 74 in FIG. 4) exchanges first and second delay data signals $j_1$ and $j_2$ for the input signals $y_1$ and $y_2$ as described above in connection with FIGS. 3–6. Thus, the switching of the output audio signal from a delayed digital audio signal having a previous delay to another audio signal having a new delay can be performed with fading operation without undesirably delayed response to variation in the video delay.

Figure 12:
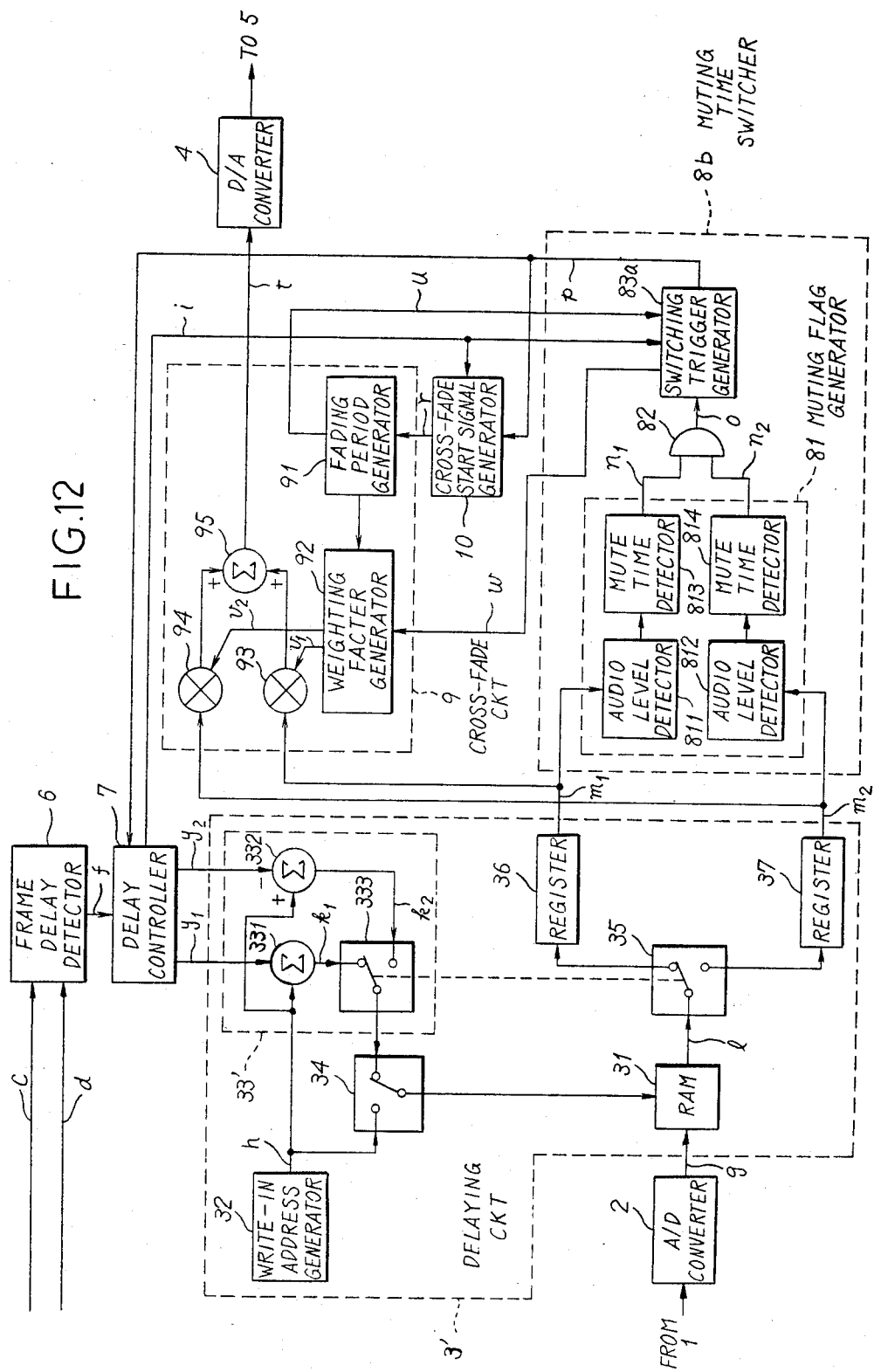
FIG. 12 is a block diagram of a main part of a fourth embodiment according to the present invention.

In the embodiment of FIG. 9, selector switch 11 is used for selecting one of output signal q from selector switch 84 and output signal t from cross-fade circuit 9. However, selector switch 11 can be omitted and the output signal t of cross-fade circuit 9 can be directly supplied to the D/A converter 4, as shown in FIG. 12.

As will be understood from description of the operation of the synchronizer of FIG. 9 and as will be seen in FIGS. 9 and 10, the output signal t is equivalent to the output signal q from selector switch 84 except the period $T_2$ of the cross-fade operation.

In FIG. 9, when selector switch 84 selects delayed digital audio signal $m_1$ ($m_2$) from register 36 (37), coefficient signal $v_1$ ($v_2$) has a value of 1 while coefficient signal $v_2$ ($v_1$) has a value 0. Therefore, the delayed digital audio signal $m_1$ ($m_2$) is produced as an output signal t from adder 95 through multiplier 93 (94).

Further, when the cross-fade operation is carried out, the output signal t is also selected in FIG. 9. Accordingly, the output signal t of adder 95 is always supplied to D/A converter 4 as an input signal thereto, as shown in FIG. 12, which is equivalent with the output signal of selector switch 11 in FIG. 9.

In FIG. 12, selector switch 84 of FIG. 9 is also omitted.

The synchronizer of FIG. 12 is simple and desirable in comparison with the embodiment of FIG. 9.

Figure 13:
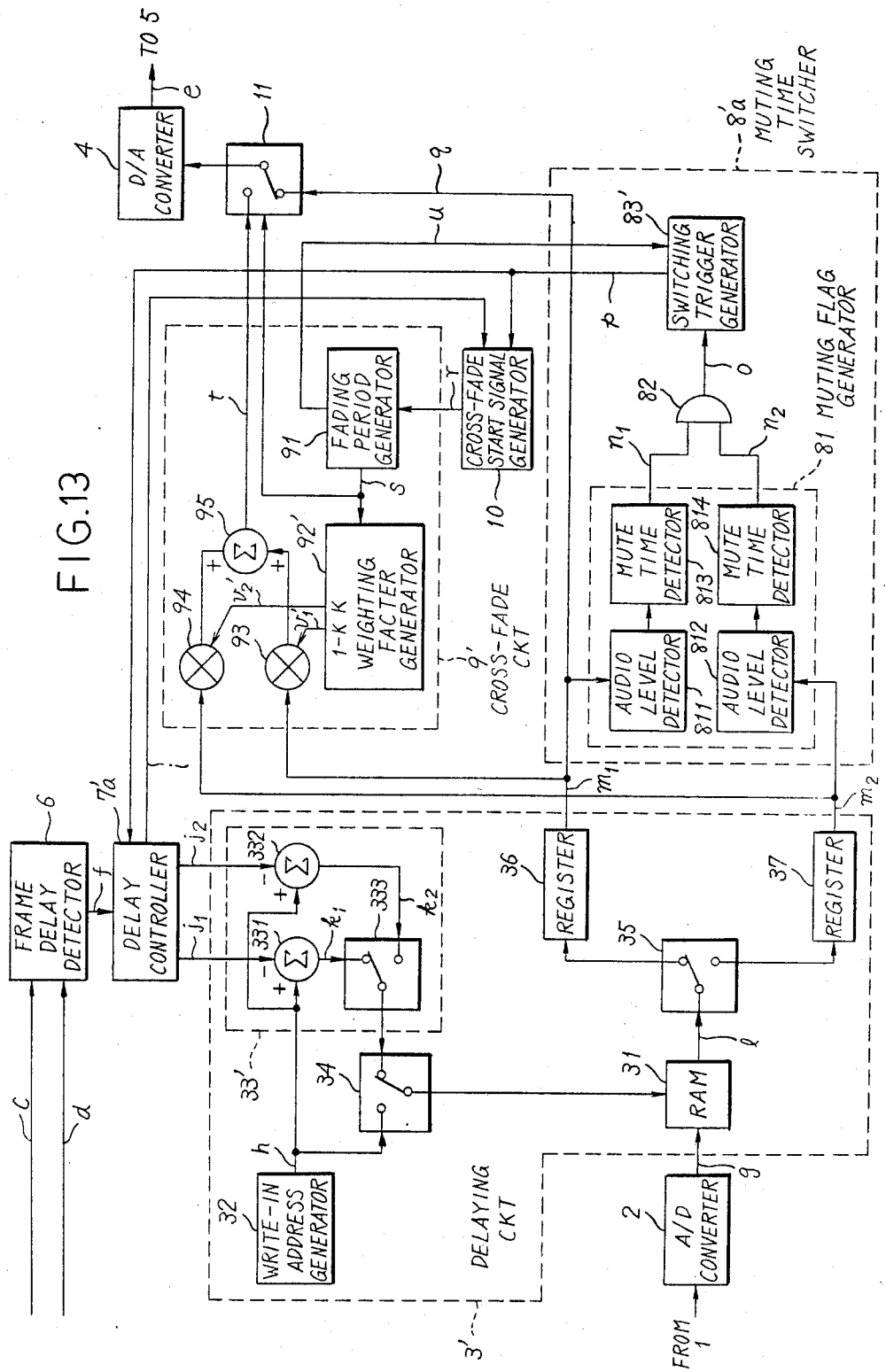
FIG. 13 illustrates waveforms at various points for explaining operation of the fourth embodiment of FIG. 12.

Referring to FIG. 13, a fourth embodiment shown therein is similar to synchronizer of FIG. 7 except a cross-fade circuit 9', cross-fade start signal generator 10 and selector switch 11 similar to those in FIG. 9. Similar parts are designated by the same reference characters as in FIGS. 7 and 9.

Delay controller 7'a consists of first register 71 and comparator 72 as shown in FIG. 4, and is similar to delay controller 7' illustrated in FIG. 7 except that delay controller 7'a produces the video delay change signal i for cross-fade start signal generator 10.

Switching trigger generator 83' is similar to switching trigger generator 83' in FIG. 7, but generates the control signal p in response to not only the muting coincidence signal o but also the cross-fade end signal u from cross-fade period generator 91 similar to that in FIG. 9.

Fading period generator 91 is similar to fading period generator 91 in FIG. 9.

Weighting factor generator 92' is similar to generator 92 in FIG. 9 in producing coefficient signals $v_1'$ and $v_2'$ for multipliers, but has following differences.

Figure 14:
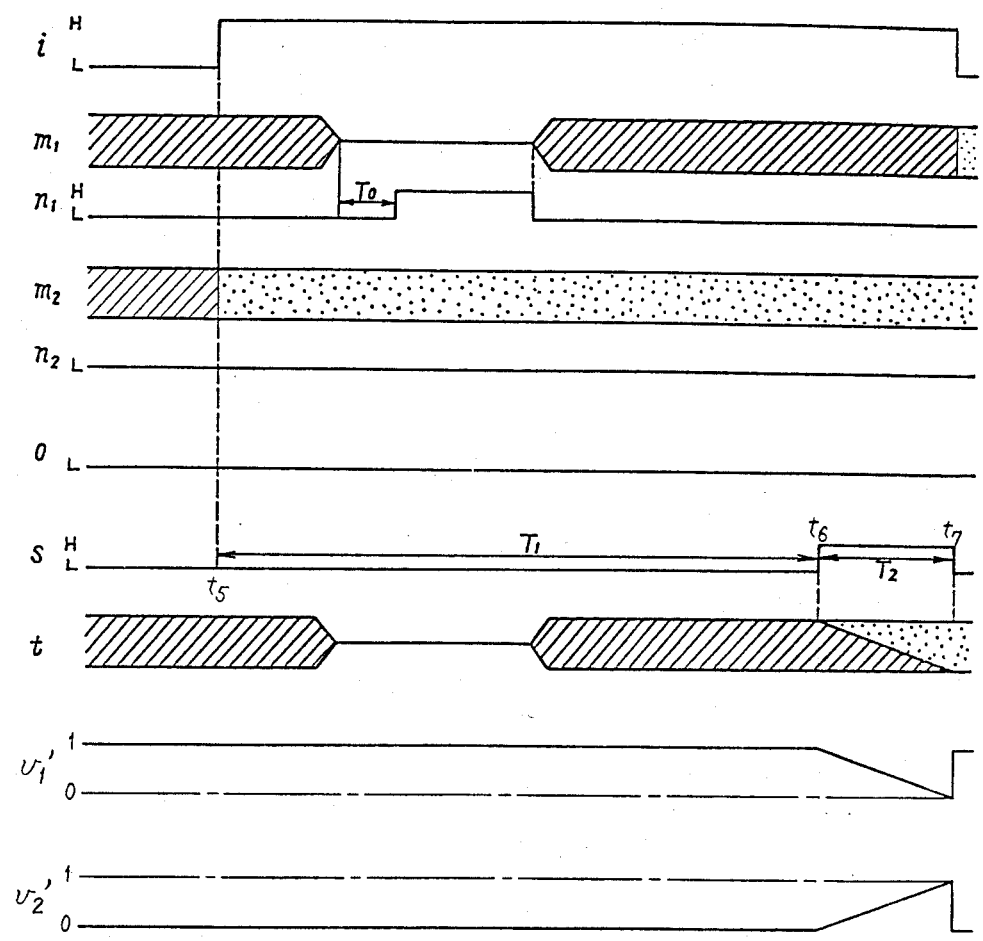
FIG. 14 is a block diagram of a main part of a fifth embodiment according to the present invention.

Weighting factor generator 92' does not have an input of trigger pulse w from switching trigger generator 83' and operates in response to only the cross-fade period signal s from cross-fade period generator 91. In absence of cross-fade period signal s, first and second coefficient signals $v_1'$ and $v_2'$ are maintained at 1 and 0, respectively. In response to the cross-fade period signal s, those coefficient signals $v_1'$ and $v_2'$ have first and second coefficients $(1-K)$ and K, respectively. K gradually increases from 0 to 1 within the predetermined cross-fade period $T_2$. After end of each cross-fade operation of period $T_2$, first and second coefficient signals $v_{1'}$ and $v_{2'}$ have again coefficients 1 and 0, respectively, as shown in FIG. 14.

Cross-fade start signal generator 10 is also similar to that in FIG. 9. Selector switch 11 selects one of output signal q from register 36 and output signal t from adder 95 under control of cross-fade period signals and supplies the selected one to D/A converter 4.

When the video delay signal f remains constant, the synchronizer of FIG. 13 operates in the same manner as in FIG. 7, the output digital audio signal q is supplied to D/A converter 4 through selector switch 11.

When the video delay signal f changes, the operation is also similar to that of FIG. 7. However, when the coincidence of the muting times of the two delayed digital audio signals $m_1$ and $m_2$ can not be detected for a long time, cross-fade start signal generator 10 generates cross-fade start signal r in the similar manner as in FIG. 9. Thus, the delayed digital audio signals $m_1$ and $m_2$ are faded out and faded in at multipliers 93 and 94. The faded-out and faded-in signals are added to each other and are produced as a cross-faded signal t, as shown in FIG. 14. The cross-faded signal t is selected at selector switch 11 and supplied to D/A converter 4 in the similar manner as in FIG. 9. After cross-fade operation is completed, fading period generator 91 generates cross-fade end signal u, and switching trigger generator 83' generates the control signal p. As a result, the first delay data signal $j_1$ has a video delay after the variation, and the digital audio signal is read out into register 36 as the signal $m_1$ with the video delay after the variation. The signal $m_1$ is supplied to D/A converter 4 through selector switch 11 which is freed from cross-fade period signal s.

Thus, the audio synchronizer of FIG. 13 can synchronize the incoming audio signal to the reference video signal d without undesirable click sound and undesired amplitude reduction of the output audio signal.

In FIG. 13, the coefficient signal $v_{1'}$ has always a value of 1 in absence of cross-fade period signal s. Therefore, the delayed digital audio signal $m_1$ corresponding to the delay data signal $j_1$ is produced from adder 95 through multiplier 93. Accordingly, selector switch 11 can be omitted and the output signal t is directly supplied to D/A converter 4 as shown in FIG. 15.

Figure 15:
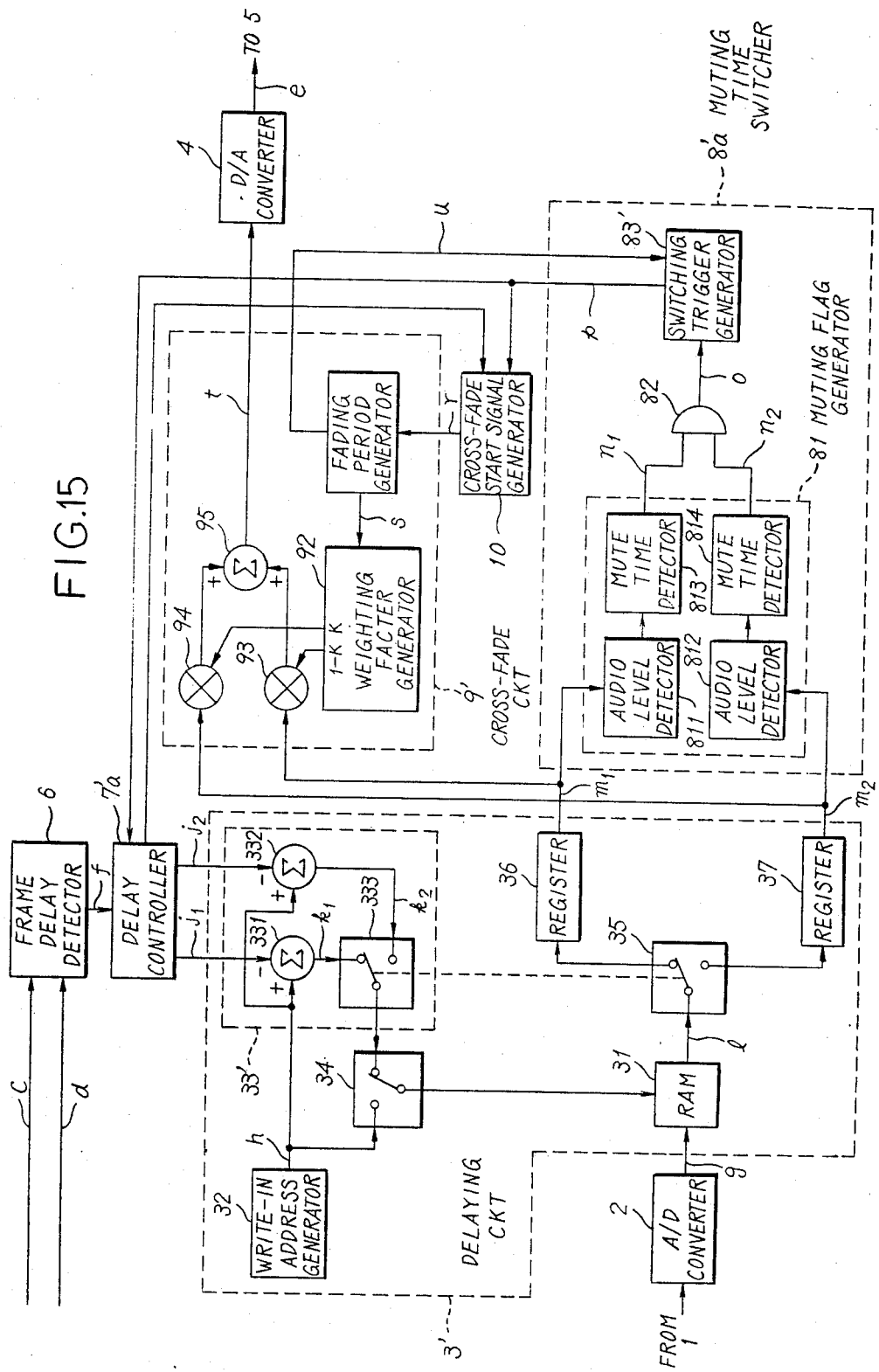
FIG. 15 is a block diagram of a main part of a sixth embodiment according to the present invention.

The embodiment of FIG. 15 is more simple in comparison with the synchronizer of FIG. 13.

A further description is omitted as to the embodiment of FIG. 15 because the arrangement and the operation is entirely similar to those in FIG. 13 except the selector switch 11 of FIG. 13.

In the above-described embodiments, although muting flag generator 81 consists of two audio level detectors 811 and 812, and two mute time detectors 813 and 814, it may comprise an audio level detector and a mute time detector so that both muting periods of the first and second read-out data $m_1$ and $m_2$ are detected by time sharing control. Furthermore, the read-out digital audio signal l may be supplied to a pair of audio level detector and mute time detector which produces directly an output signal as the muting coincidence signal o to the switching trigger generator 83.

What is claimed is:

1. A digital audio synchronizing system for synchronizing an audio signal accompanying an input composite video signal to a reference composite video signal to which said input composite video signal should be synchronized, said digital audio synchronizing system comprising:
    delay detecting means for detecting a video delay between said input and said reference composite video signals to produce a video delay signal representative of said video delay;
    first means responsive to a control signal for storing said video delay signal as a stored delay signal to produce said stored delay signal as a first delay data signal representative of a first delay which said video delay signal has when stored in said first means;
    second means for producing said video delay as a second delay data signal;
    encoding means for encoding said audio signal into an input digital audio signal;
    delaying means responsive to said first and said second delay data signals for delaying said input digital audio signal to produce first and second delayed digital audio signals which have said first delay and said video delay relative to said input digital audio signal, respectively;
    producing means for producing said first delayed digital audio signal as an output digital audio signal;
    muting flag generating means responsive to said first and second delayed digital audio signals for generating first and second muting flag signals when said first and said second delayed digital audio signals are at a predetermined muting level, respectively;
    muting coincidence detecting means for detecting coincidence between said first and said second muting flag signals to produce a muting coincidence signal; and
    control signal generating means for generating said control signal in response to said coincidence signal.

2. An audio synchronizing system as claimed in claim 1, wherein said muting flag generating means comprises: first and second level detecting means for detecting signal levels of said first and second delayed digital audio signals to produce first and second mute level signals when the signal levels of said first and second delayed digital audio signals are lower than said predetermined muting level, respectively; and first and second mute time detecting means for detecting durations of said first and second mute level signals to produce said first and second muting flag signals when the durations of said first and second muting level signals are longer than a predetermined time, respectively.

3. An audio synchronizing system as claimed in claim 1, wherein said muting coincidence detecting means is an AND gate.

4. An audio synchronizing system as claimed in claim 1, further comprises: variation detecting means responsive to said video delay signal for detecting a variation in said video delay to produce a video delay change signal, said control signal generating means being coupled to said variation detecting means to produce said control signal in response to said coincidence signal after receiving said video delay change signal.

5. An audio synchronizing system as claimed in claim 4, wherein said first means is first register means which stores said video delay signal in response to said control signal, said delaying means comprising two input terminals for receiving said first and second delay data signals, said producing means comprising first switching means responsive to said control signal for distributing said first and said second delay data signals to said two input terminals alternately, second and third register means corresponding to said two input terminals for storing said first delayed digital audio signal alternately, and second switching means responsive to said control signal for selecting one of said second and third register means alternately so that said first delayed digital audio signal is produced through said second switching means as said output digital audio signal.

6. An audio synchronizing system as claimed in claim 1, wherein said first means is first register means which stores said video delay signal in response to said control signal, said delaying means comprising first and second input terminals for receiving said first and second delay data signals, respectively, said producing means comprising second register means corresponding to said first input terminal for storing said first delayed digital audio signal to produce said stored first delayed digital audio signal as said output digital audio signal.

7. An audio synchronizing system as claimed in claim 1, further comprising:
 variation detecting means responsive to said video delay signal for detecting a variation in said video delay to produce a video delay change signal;
 cross-fade start signal generating means responsive to said video delay change signal for generating a cross-fade start signal after a second predetermined time from said variation; and
 cross-fading means responsive to said cross-fade start signal for cross-fading said first and second delayed digital audio signals during a predetermined cross-fade period to produce a cross-faded signal during said predetermined cross-fade period, said cross-fading means furthermore producing a cross-fade end signal at an end of said predetermined cross-fade period;
 said producing means being coupled to said cross-fading means to produce said cross-faded signal and said first delayed digital audio signal as said output digital audio signal during cross-fade period and except for said cross-fade period, respectively;
 said control signal generating means being coupled to said cross-fading means to produce said control signal in response to said coincidence signal and furthermore in response to said cross-fade end signal.

8. An audio synchronizing system as claimed in claim 7, wherein said cross-fade start signal generating means comprises counter means responsive to said video delay change signal for counting clock pulses to a predetermined maximum value to produce said cross-fade start signal, said counter means being reset by said control signal.

9. An audio synchronizing system as claimed in claim 7, wherein said cross-fading means comprises cross-fade period generating means responsive to said cross-fade start signal for producing a cross-fade period signal representative of said a predetermined cross-fade period, said cross-fade period generating means generating said cross-fade end signal, fade-out means responsive to said cross-fade period signal for fading out said first delayed digital audio signal during said cross-fade period to produce a faded-out signal, fade-in means responsive to said cross-fade period signal for fading in said second delayed digital audio signal for said cross-fade period to produce a faded-in signal, and combining means for combining said faded-out signal and said faded-in signal to produce a combined signal as said cross-faded signal.

10. An audio synchronizing system as claimed in claim 9, wherein said producing means comprises selector means responsive to said cross-fade period signal for selecting said cross-faded signal and said first delayed digital audio signal during said cross-fade period and except for said cross-fade period, respectively, to produce said selected one as said output digital audio signal.

11. An audio synchronizing system as claimed in claim 9, wherein said cross-fading means further comprises coefficient generating means responsive to said cross-fade period signal for generating a first and a second coefficient signal representative of a first and a second coefficient gradually decreasing from 1 to 0 and increasing from 0 to 1, respectively, during said cross-fade period, said fade-out means comprising a first multiplier means for multiplying said first delayed digital audio signal by said first coefficient signal, said fade-out means comprising a second multiplier means for multiplying said second delayed digital audio signal by said second coefficient signal.

12. An audio synchronizing system as claimed in claim 11, wherein said coefficient generating means generates a third and a fourth coefficient signal representative of a third and a fourth fixed value of 1 and 0, respectively, said third and fourth coefficient signals being supplied as multiples to said first and second multiplier means, respectively, except for said cross-fade period, said producing means being coupled to said first multiplier means and said combining means to produce said first digital audio signal as said output digital audio signal except for cross-fade operation.

* * * * *